M. M. WHEELER.
SWINGLETREE.
APPLICATION FILED MAR. 14, 1908.
925,735.
Patented June 22, 1909.
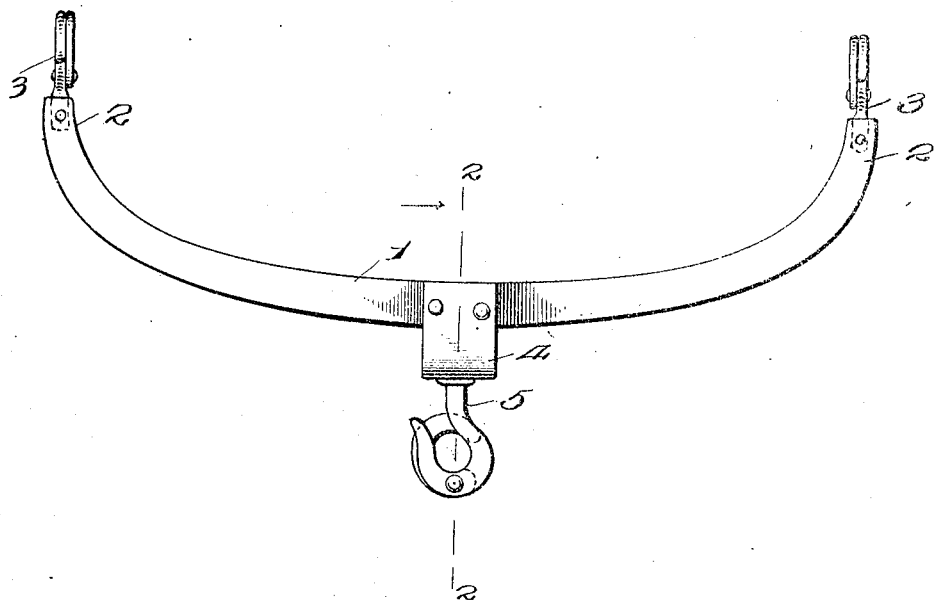
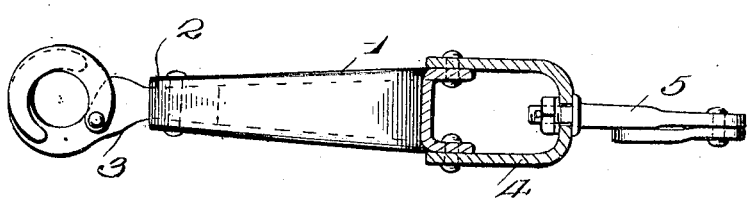

UNITED STATES PATENT OFFICE.

MELLEY M. WHEELER, OF WINNSBORO, TEXAS.

SWINGLETREE.

No. 925,735.  Specification of Letters Patent.  Patented June 22, 1909.

Application filed March 14, 1908. Serial No. 421,118.

*To all whom it may concern:*

Be it known that I, MELLEY M. WHEELER, citizen of the United States, residing at Winnsboro, in the county of Wood and State of Texas, have invented certain new and useful Improvements in Swingletrees, of which the following is a specification.

This invention has for its object a simple, light and strong construction of swingletree for plows or other agricultural instruments, or for vehicles in general, and the invention consists in certain constructions and arrangements of the parts that I shall hereinafter fully describe and claim.

For a full understanding of the invention and the merits thereof, reference is to be had to the following description and the accompanying drawing, in which:

Figure 1 is a plan view of my improved swingle-tree; and, Fig. 2 is a transverse sectional view thereof, on the line 2—2 of Fig. 1.

Corresponding and like parts are referred to in the following description and indicated in all the views of the drawing by the same reference characters.

My improved swingle-tree is constructed preferably of sheet metal of U-shape throughout in cross section, as shown, and bowed from end to end, the two members formed by bending the metal transversely so as to produce the channeled structure shown, the channel tapering from the middle of the swingletree toward each end, as clearly illustrated in the drawing. Within each end 2 of the swingle-tree, a hook 3 is secured by a rivet or bolt or other fastening means. These hooks 3 may be of any desired construction, and in the present instance are shown as of the open or split-link variety.

4 designates a clip which is also of substantially U-shape, and which embraces the rear side of the channeled bar forming the body portion of the swingle-tree, being riveted or bolted thereto, as desired.

5 designates an attaching hook which is swiveled in the clip or yoke 4, and which, in the present instance, is also of the open link type, as shown. Preferably, the body portion of the swingle-tree is substantially semicircular, and the distance between its ends corresponds to the usual length of the swingle-trees heretofore employed.

From the foregoing description, in connection with the accompanying drawing, it will be seen that I have provided a very simple, durable and efficient construction of swingle-tree, which is particularly useful in agricultural pursuits, as it will not be so liable to injure growing plants during cultivation, or young trees in an orchard, and will not be so liable to cause the lines to become entangled therein. The horse will not be liable to get his legs out of or over the traces. It will be useful with a horse that has a tendency to kick or buck, owing to the curved formation of the body portion of the device. It is obvious it may be fastened to any kind of plow or agricultural instruments without using lap links.

Having thus described the invention, what I claim is:

A swingletree, the body portion of which is bowed from end to end and substantially U-shaped in cross section throughout its length, thereby forming a channeled structure, the channel facing rearwardly and tapering in width from the middle toward both ends of the body portion, a U-shaped yoke secured at its ends to the body portion at the middle thereof and extending rearwardly therefrom, said ends embracing the top of the channeled body portion, thereby holding the body portion in shape, an attaching hook having its shank removably swiveled in the middle of the yoke, and draft hooks secured to the ends of the body portion and pivotally mounted in the channel thereof.

In testimony whereof I affix my signature in presence of two witnesses.

MELLEY M. WHEELER. [L. S.]

Witnesses:
　W. W. REID,
　R. E. SAGE.